Dec. 6, 1960 R. A. KOLPEK 2,963,541

TELEGRAPH SWITCHING CENTER ARRANGEMENT

Filed Nov. 13, 1956 6 Sheets-Sheet 1

INVENTOR.
ROBERT A. KOLPEK

BY Smith, Olsen, Baird and Miller

ATTYS.

TELEGRAPH SWITCHING CENTER ARRANGEMENT

Filed Nov. 13, 1956 6 Sheets-Sheet 2

INVENTOR.
ROBERT A. KOLPEK
BY
Smith, Olsen, Baird and Miller
ATTYS.

Dec. 6, 1960 R. A. KOLPEK 2,963,541

TELEGRAPH SWITCHING CENTER ARRANGEMENT

Filed Nov. 13, 1956 6 Sheets-Sheet 3

INVENTOR.
ROBERT A. KOLPEK

BY
Smith, Olsen, Baird and Miller
ATTYS.

TELEGRAPH SWITCHING CENTER ARRANGEMENT

Filed Nov. 13, 1956 6 Sheets-Sheet 4

INVENTOR.
ROBERT A. KOLPEK
BY
Smith, Olsen, Baird and Miller
ATTYS.

INVENTOR.
ROBERT A. KOLPEK
BY
Smith, Olsen, Baird & Miller
ATTYS.

Dec. 6, 1960 R. A. KOLPEK 2,963,541

TELEGRAPH SWITCHING CENTER ARRANGEMENT

Filed Nov. 13, 1956 6 Sheets-Sheet 6

INVENTOR.
ROBERT A. KOLPEK

BY

Smith, Olsen, Baird and Miller

ATTYS.

2,963,541
Patented Dec. 6, 1960

2,963,541

TELEGRAPH SWITCHING CENTER ARRANGEMENT

Robert A. Kolpek, Waukegan, Ill., assignor to Automatic Electric Laboratories, Inc., a corporation of Delaware Filed Nov. 13, 1956, Ser. No. 621,679

14 Claims. (Cl. 178—2)

Figures 1, 8:
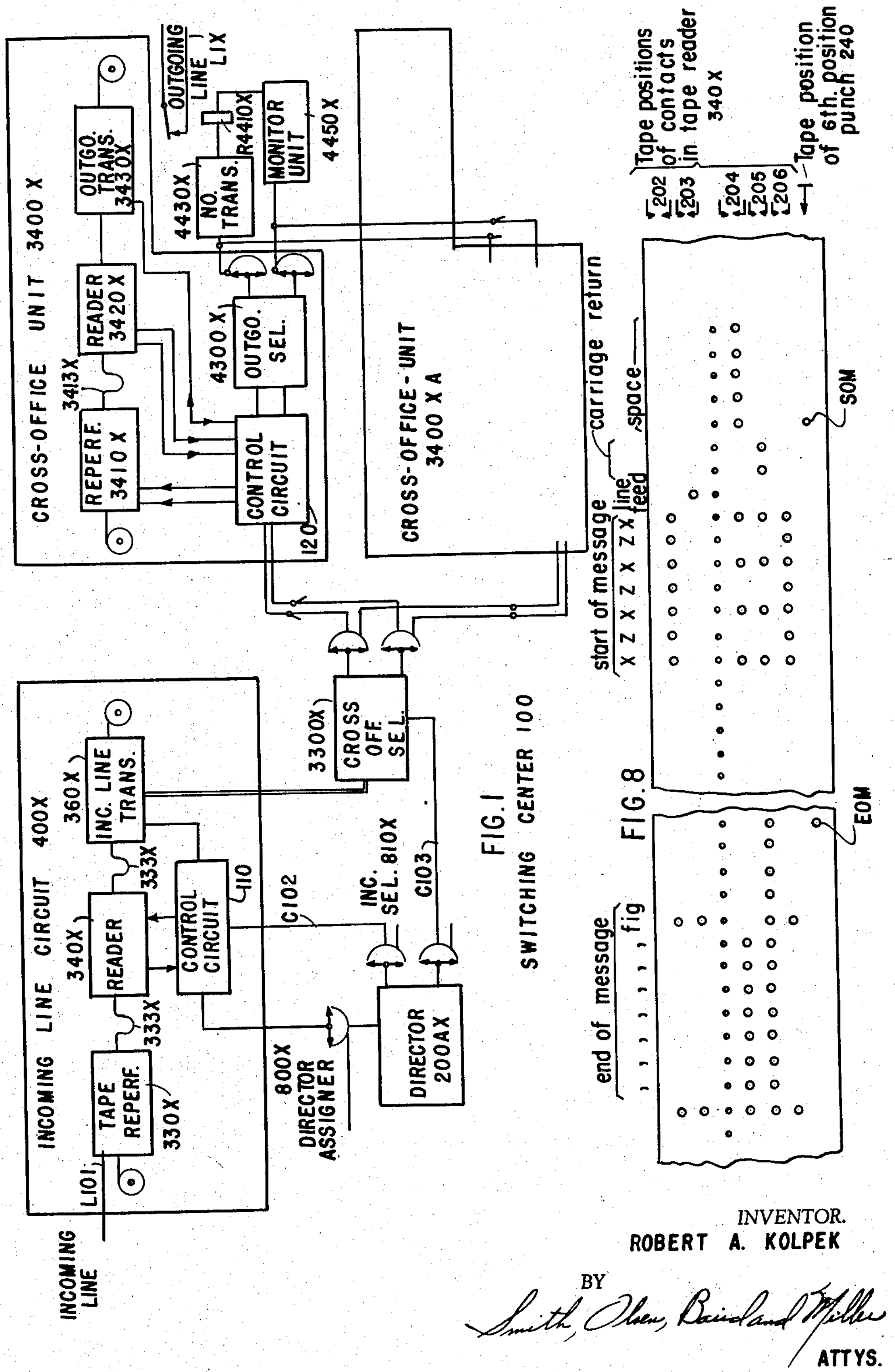

The present invention relates to telegraph systems and particularly to transmission arrangements in the switching centers thereof.

In telegraph systems each telegraph message is normally preceded by a standard group of characters which designate the start of the telegraph message and is normally followed by another different standard group of characters which designate the end of the telegraph message. It is conventional practice to detect the start-of-message designation characters and the end-of-message designation characters in the incoming line circuit equipment of a switching center at the time that the message is incoming thereto and to duplicate this detection of the start-of-message designation characters and the end-of-message designation characters in the outgoing line circuit equipment of a switching center after the message has been transferred from the incoming line circuit and before the message is transmitted over the outgoing line. This duplicated detection of standard characters in a telegraph message adds to the time required to process a telegraph message through the switching center and requires a duplication of detection equipment.

It is an object of the present invention to provide an improved telegraph switching center arrangement wherein detection of the standard group of start-of-message characters and end-of-message characters in a telegraph message is performed at the incoming line circuit and is verified thereat on the tape record of the message and thereafter detection is made in the outgoing line circuit only for the verification recorded on the tape.

A further object of the invention is to provide in the telegraph switching center apparatus which is responsive to the detection of a start-of-message designation and is responsive to the detection of an end-of-message designation for perforating the incoming line message tape in a distinctive abbreviated manner and apparatus which is responsive to the distinctive perforation on the incoming line message tape for causing similar distinctive perforations to be made in the outgoing line message tape and apparatus which is responsive to the detection of the distinctive perforations in the outgoing line message tape for causing the telegraph message to be transmitted over an outgoing line.

A more specific object of the invention is to provide in a telegraph switching center improved incoming line circuits and outgoing line circuits wherein the incoming line circuit includes conventional tape perforating apparatus operated in accordance with telegraph message characters to perforate the incoming line tape in code form and an auxiliary tape perforating apparatus operated in accordance with a predetermined sequence of message characters to perforate the incoming line tape in a distinctive perforation and a transmitter responsive to the code form perforations and to the distinctive perforations for transmitting corresponding signals to the outgoing line circuit and wherein the outgoing line circuit includes conventional tape perforating apparatus and auxiliary tape perforating apparatus respectively responsive to the code form perforation signals and distinctive perforation signals from the incoming line circuit to perforate the outgoing line tape in corresponding perforations and includes a tape detector responsive to the distinctive perforations for causing the telegraph message to be transmitted over an outgoing line.

Further features of the invention pertain to the particular arrangement of the circuit elements of the telegraph system, whereby the above-outlined and additional operating features thereof are attained.

Figure 7:
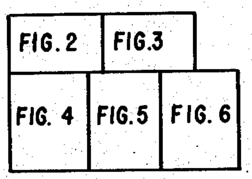

The invention, both as to its organization and method of operation, together with further objects and advantages thereof, will be best understood by reference to the following specifications taken in conjunction with the accompanying drawings, in which:

Figure 1 illustrates in block schematic form the switching apparatus and the trunking arrangement in a switching center of the telegraph system in accordance with the invention;

Figs. 2 to 6, inclusive, taken together, illustrate the details of the switching center of Fig. 1;

Fig. 7 illustrates the manner in which Figs. 2 to 6, inclusive, are combined; and Fig. 8 illustrates a portion of incoming line circuit message tape perforated in a conventional five character code for a start-of-message designation and an end-of-message designation and perforated in accordance with the invention with a distinctive perforation to indicate a proper start-of-message designation and a proper end-of-message designation.

*The general arrangement of the switching center*

Referring to Fig. 1, the switching center 100 there illustrated in block schematic form comprises but one station in an automatic telegraph switching system such as that disclosed in the copending application to Richard C. Stiles, Serial No. 260,854, filed December 10, 1951, now Patent No. 2,805,283, granted September 3, 1957, and including a large number of stations serving a large communication area. Additionally, the switching center 100 is in its switching functions substantially identical to the switching center described in detail in the above mentioned Stiles application and is adapted to serve a plurality of telegraph lines incoming thereto and to route telegraph messages received over the incoming lines to appropriate outgoing lines extending to the message destinations. A substantial quantity of the apparatus utilized in the present invention corresponds to apparatus described in the above mentioned Stiles patent, so that the apparatus in the present application that corresponds to apparatus of the Stiles patent is identified by the numerals used in the Stiles patent, except that in the present application the suffix X has been added to the identifying numerals to indicate the above mentioned correspondence. This pattern is carried forth in the block schematic illustration of Fig. 1 and in the detailed illustrations of Figs. 2 to 6, inclusive.

Specifically, the switching center 100 includes a plurality of incoming line circuits including the incoming line circuit 400X each terminating an individually associated telegraph line such as the line L101 incoming from a remote switching center, and a plurality of cross-office units including the cross-office units 3400X and 3400XA each having access to the plurality of outgoing lines extending to distant switching centers. Additionally, each of the incoming line circuits 400X, etc., has individually associated therewith a cross-office selector, such as the cross-office selector 3300X which selectors have access to all of the cross-office units 3400X, etc. Also included in the switching center is a group of directors including the director 200AX which, when idle, are alloted to the use of the calling incoming line circuits via a director assigner 800X. Each of the directors 200AX, etc., have individually associated therewith a line selector switch, such as the line selector switch 810X illustrated, which have access to all of the line circuits and their individually associated cross-office selectors.

Considering now the incoming line circuits 400X, etc., there is provided in each line circuit, apparatus as illustrated in the line circuit 400X including a supply of perforating tape 333X, a tape reperforator 330X, a tape reader 340X, an incoming line transmitter 360X, and a group of control circuits 110 operated from the tape reader 340X. The tape reader 340X is operated in accordance with selected portions of the telegraph message perforated on the tape 333X to further operate the control circuits 110 to activate the director assigner 800X and to mark the line extending to the line selector 810X as calling. The tape transmitter 360X is controlled from the group of control circuits 110 for transmitting the telegraph message contained on the tape 333X to the cross-office selector 330X associated with the line circuit 400X.

Each of the cross-office units 3400X, etc. is provided with apparatus such as that illustrated in the cross-office unit 3400X including a supply of perforating tape 3413X, a tape reperforator 3410X, a tape reader 3420X, an outgoing line transmitter 3430X, a group of control circuits 120 and an outgoing selector 4300X having access to the plurality of outgoing lines including the outgoing line LIX extending to the distant switching centers. The group of control circuits 120 is responsive to a telegraph message transmitted thereto from any one of the cross-office selectors 3300X, etc., for operating the outgoing selector 4300X to seize the outgoing line corresponding to the message address designation and for operating the reperforator 3410X to reperforate the tape 3413X in accordance with the telegraph message. The tape reader 3420X reads certain portions of the telegraph message perforated on the tape 3413X and operates the group of control circuits 120 in accordance therewith to perform certain control operations with regard to the outgoing line and to control the outgoing transmitter 3430X to transmit to the outgoing line signals corresponding to the telegraph message perforated on the tape 3413X.

Each outgoing line extending from the switching center 100 includes a number transmitter 4430X, a send relay R4440X and a monitor unit 4450X.

With regard to the operation of the apparatus included in the switching center 100, each telegraph message incoming thereto over the incoming line L101 is comprised of a first group of control characters including a start-of-message designation made up of seven characters (XZXZXZX) and an address designation followed by the body of the telegraph message and terminated by a second group of control characters including an end-of-message designation made up of a "Fig. shift" character followed by seven "comma" characters (Fig. ,,,,,,,). In response to a telegraph message transmitted on the incoming line L101, the incoming line circuit 400X is activated so that the tape reperforator 330X is operated in accordance with each character of the telegraph message to perforate the tape 333X in a combinational code of five apertures or holes that extend in a column laterally across the tape so that the first group of control characters including the start-of-message designation and the address designation, the message body and the second group of control characters including the end-of-message designation are recorded on the tape as partially shown in Fig. 8. The tape reader 340X first detects the first group of control characters and operates the group of control circuits 110 in accordance therewith whereupon the director assigner 800X is activated to seize the idle director of the group including the director 200AX and the control conductor C102 is marked as calling. Assuming that the director 200AX is the first idle director, the latter is operated and controls the line selector 810X to seize the marked control conductor C102 and to extend the connection thereover to the group of control circuits 110 and to extend a connection over the conductor C103 to the cross-office selector 3300X. Thereupon the director is operated in accordance with the message designation detected in the line circuit 400X to determine a message route and the cross-office selector 3300X is operated to select an idle one of the cross-office units 3400X, etc. Assuming that the cross-office unit 3400X is the first idle unit, the outgoing selector 4300X thereof is operated from the director 200AX to seize one of the outgoing lines LIX corresponding to the routing in the director. Thereafter the director is released and in the incoming line transmitter 360X is controlled in response to the detection from the reader 340X of the end-of-message designation to send signals corresponding to the telegraph message to the cross-office unit 3400X via the cross-office selector 3300X. The incoming line circuit 400X is then restored to normal and is prepared to receive other telegraph messages received over the incoming line L101.

In the cross-office unit 3400X the tape reperforator 3410X is operated in accordance with the signals received therein to perforate the telegraph message on the tape 3413X and the tape reader 3420X operates to sense the first and second groups of control characters thereon. In accordance therewith the group of control circuits 120 are controlled so that a first group of control characters are transmitted over the outgoing line LIX and the outgoing transmitter 3430X is operated to cause the message body and the second group of control characters to be transmitted over the line LIX. The detailed operation, in accordance with the invention, of the selected apparatus in the switching center 100 will be understood by reference to the Figs. 2 to 6, inclusive.

*The structure of the apparatus included in the switching center*

Figure 2:
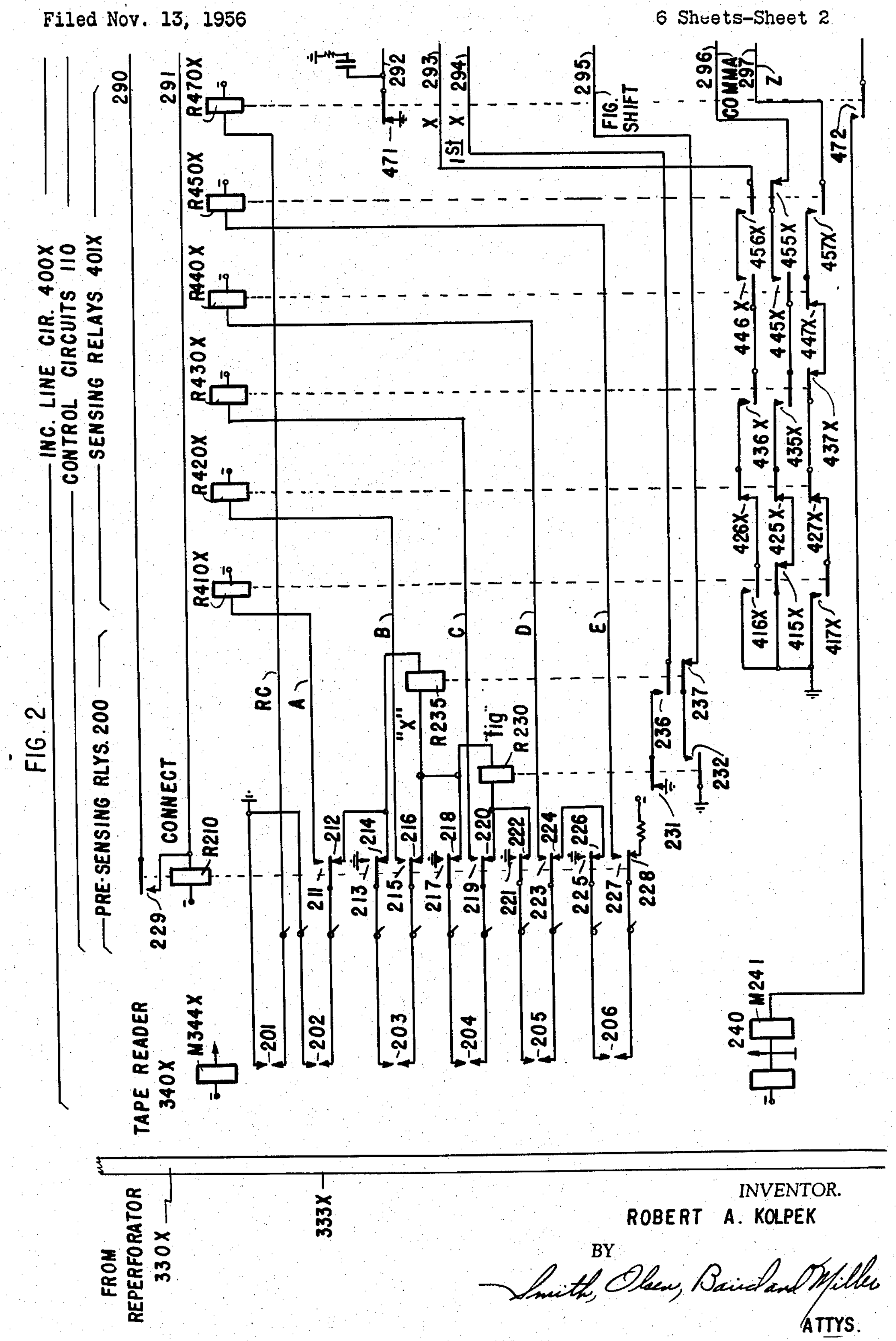
Figure 3:
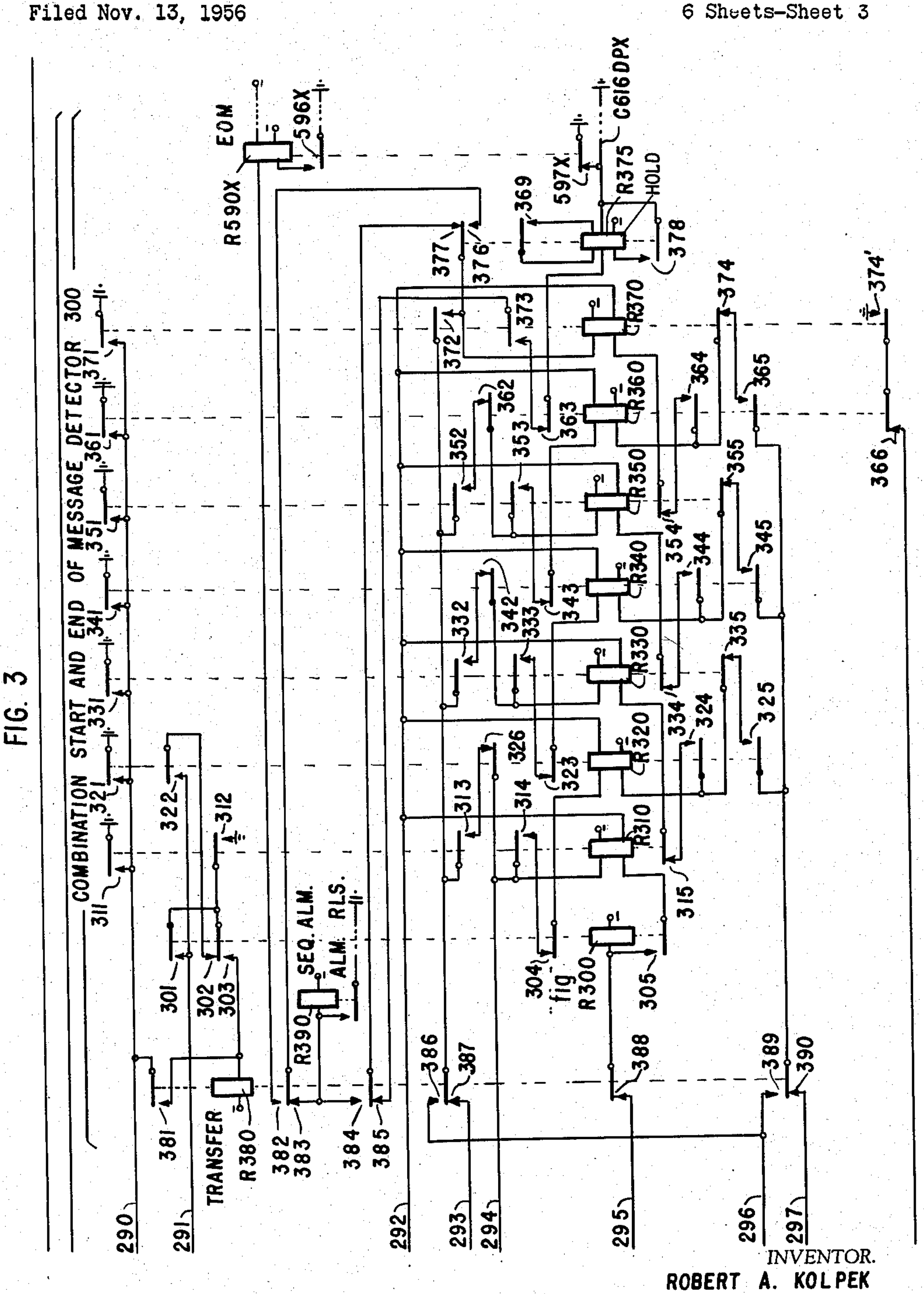
Figure 4:
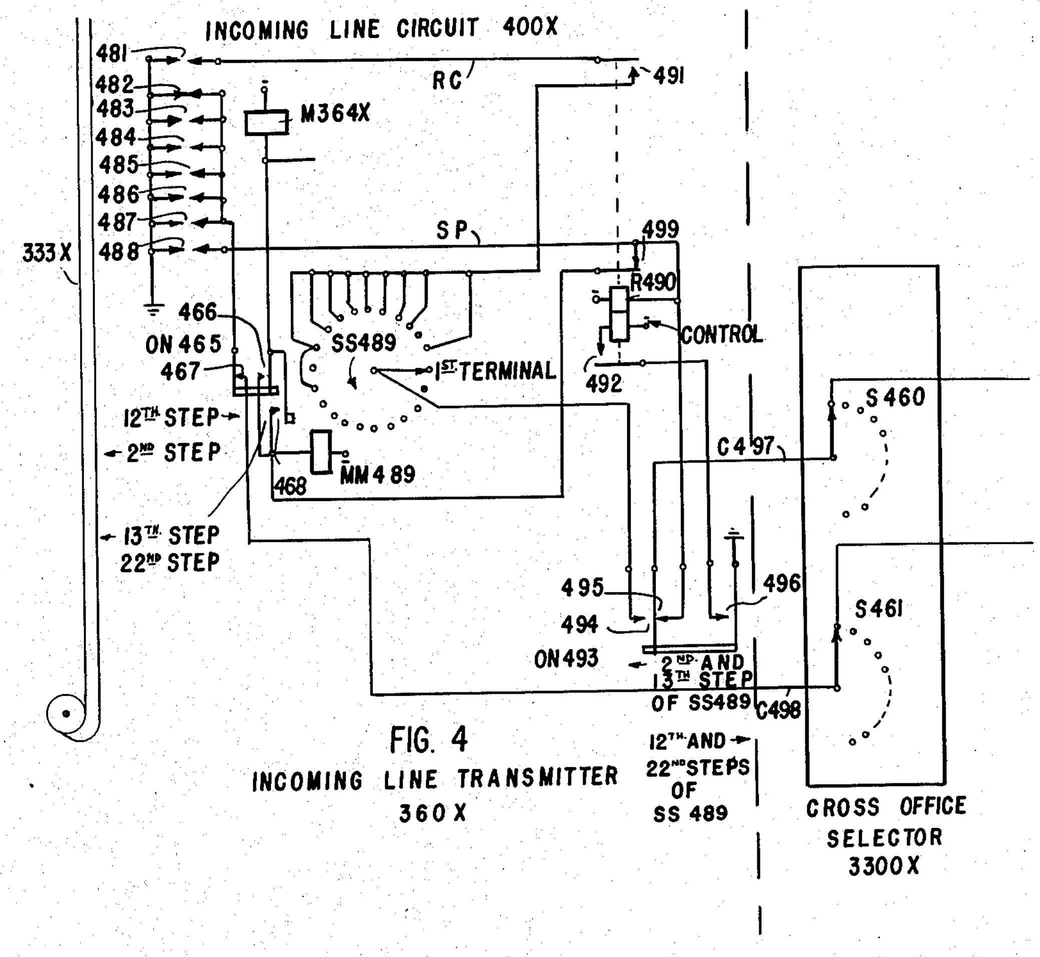
Figure 5:
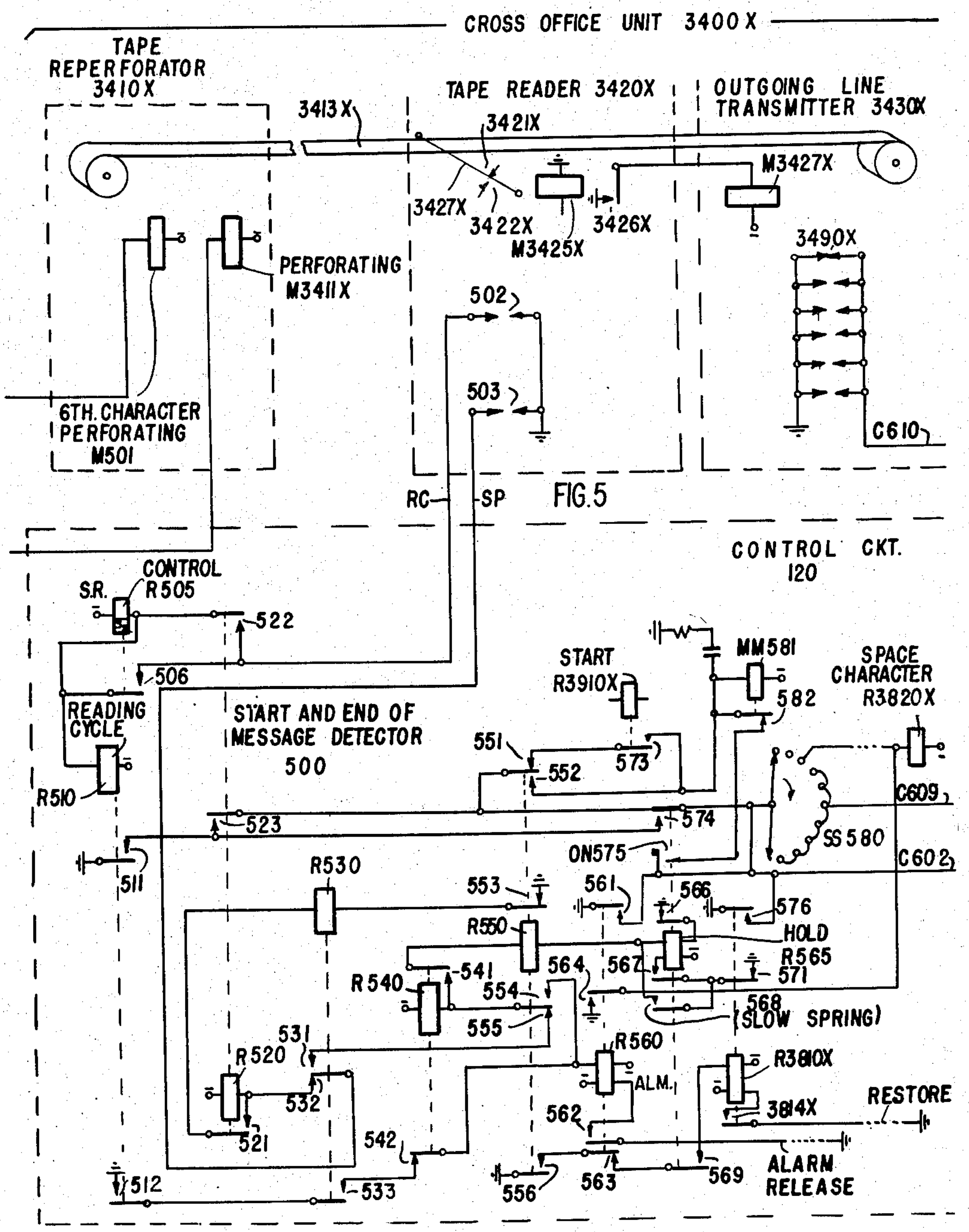
Figure 6:
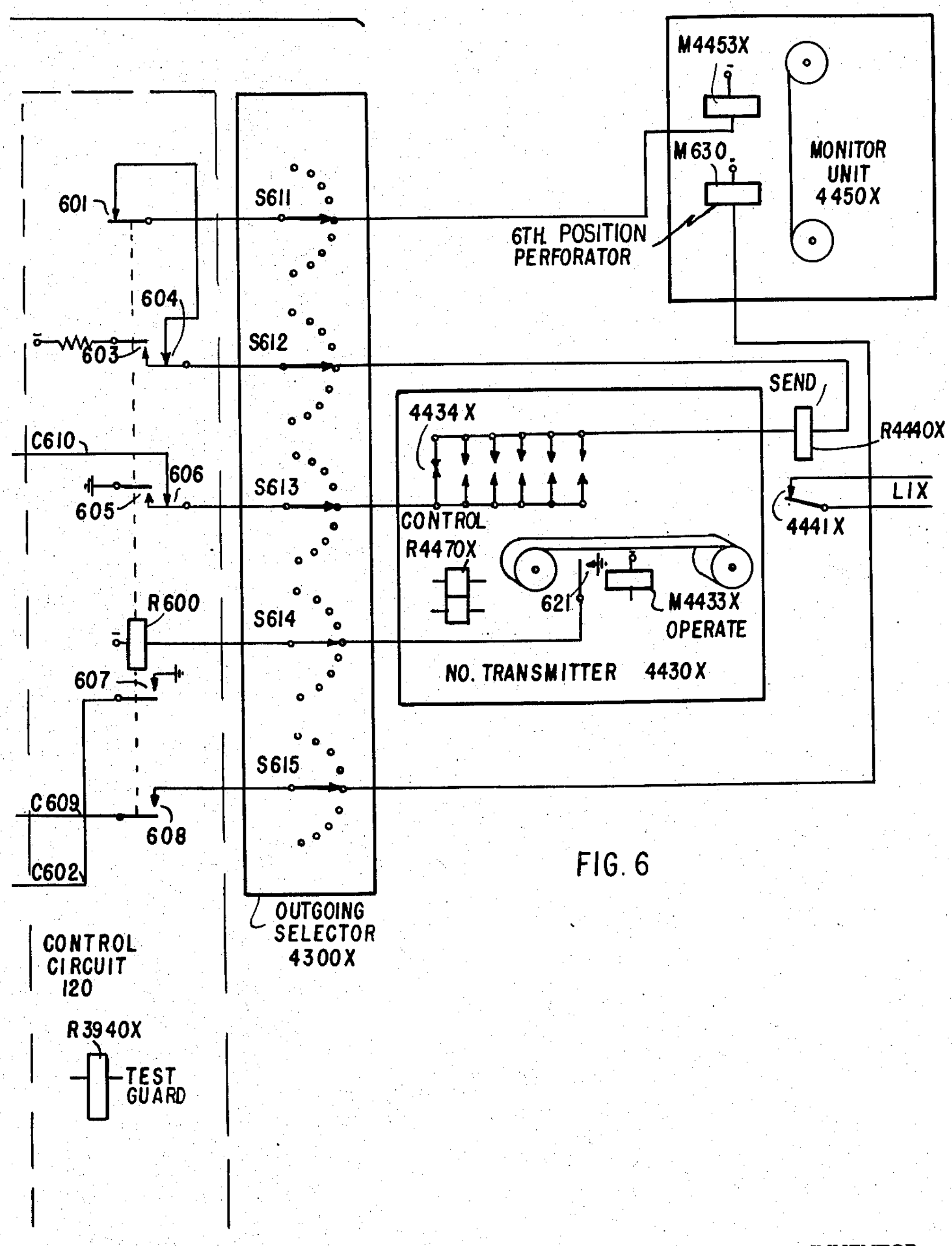

Referring specifically to Figs. 2 to 6, inclusive, there is shown in Figs. 2, 3, and 4 portions of the line circuit 400X including the tape reader 340X, the control circuits 110 and the incoming line transmitter 360X. As illustrated in Figs. 2 and 3 the control circuits 110 include a set of presensing relays 200, a set of sensing relays 401X and a combination start and end-of-message detector 300. Additionally Fig. 4 shows in block form the cross-office selector 3300X which is associated with the incoming line circuit 400X. In Figs. 5 and 6 is illustrated portions of the cross-office unit 3400X including the tape reperforator 3410X, the tape reader 3420X, the control circuits 120, the outgoing line transmitter 3430X and the outgoing selector 4300X. The control circuits 120 illustrated in Figs. 5 and 6 include a start and end-of-message detector 500 a connect relay R600, a start relay R3910X, an end relay R3810X, a space character relay R3820X and a test guard relay R3940X. In addition Fig. 6 shows the outgoing line LIX and the send relay R4440X, the number transmitter 4430X and the monitor unit 4450X associated therewith.

The tape reperforator 330X is a conventional type mechanism for perforating the tape in accordance with a five channel code and may be of the type such as that disclosed in the United States Patent No. 2,255,794 granted to R. A. Lake on September 16, 1941. The tape reader 340X includes a clutch magnet M344X, a plurality of selectively closed sensing contacts 201 to 206, inclusive, and a sixth position punch magnet 240. The clutch magnet M344X is operated and the contacts 201 are closed each time the tape 333X is fed into the tape reader 340X and positioned for a reading cycle. Also each of the contacts 202 to 206, inclusive, are conditioned by the operated magnet M344X to close during each reading cycle but are closed only when aligned with a perforation in the tape. Additionally, the contacts 202 to 206, inclusive, are closed in accordance with the code perforations at the beginning of each sensing cycle and are opened at the end of each sensing cycle, and the contacts 201 are closed and reopened within the time interval that any one of the contacts 202 to 206 inclusive, would normally remain closed. The sixth position punch 240 is arranged in the tape reader 340X so that when operated by means of the punch magnet M241 the tape 333X is perforated in an otherwise unperforated border area thereof. A tape reader mechanism adaptable for use with the circuits of the present system is disclosed in U.S. Patent No. 2,296,845, granted to N. T. Goetz on September 29, 1942.

The set of pre-sensing relays 200 includes a connect relay R210, a "Fig." relay R230 and an "X" relay R235. The set of sensing relays 401X include an "A" relay R410X, "B" relay R420X, "C" relay R430X, "D" relay R440X, "E" relay 450X and an RC relay R470X.

The combination start and end-of-message detector 300 includes a transfer relay R380, alarm relay R390, a "Fig." relay R300, a group of detector relays R310, R320, R330, R340, R350, R360 and R370, a hold relay R375 and an end-of-message relay R590X.

The incoming line transmitter 360X includes a clutch magnet M364X, a plurality of sensing contacts 481 to 488, inclusive, a sequence switch SS489, a motor magnet MM489 associated therewith, a control relay R490, an off-normal switch ON465 and an off-normal switch ON493. These contacts 481 to 488, inclusive, are controlled so that when the clutch magnet M364X is operated, the contacts 481 are closed and the contacts 482 are opened. A short time thereafter the contacts 488 which are aligned in the sixth perforate position on the tape 333X are conditioned to close, and are closed only if a perforation appears in the sixth perforate position on the tape, and at the same time the control contacts 483 to 487 inclusive, are conditioned to close and open in sequence, and are closed only as a perforation appears in the corresponding punch position on the tape 333X, so that only one of the five contacts 483 to 487, inclusive, are closed and reopened at a time. When the contacts 487 are controlled to be reopened the contacts 488 are also controlled to be reopened and thereafter the contacts 481 are opened and the contacts 482 are closed, thereby completing a reading cycle in the transmitter.

The tape reperforator 3410X is substantially identical to the tape reperforator 330X and includes a perforating magnet M3411X and an additional sixth position perforating magnet M501. The tape reader 3420X includes the tape tension arm 3427X, the clutch magnet M3425X and the control contacts 502 and 503. The outgoing line transmitter 3430X includes the clutch magnet M3427X and the set of control contacts 3490X. The tape reperforator 3410X included in the cross-office unit 3400X is of the conventional type as disclosed in the above mentioned patent to R. A. Lake; the tape reader 3420X and the outgoing line transmitter 3430X are also of conventional types such as those disclosed in the above mentioned patent to Goetz.

The start and end-of message detector 500 of the control circuits 120 of the cross-office unit 3400X includes a sequence switch SS580 and a motor magnet MM581 associated therewith and a group of relays including a control relay R505, a reading cycle relay R510, a set of four detector relays R520, R530, R540 and R550, an alarm relay R560, a hold relay R565 and an end relay R3810X.

The number transmitter 4430X includes a control relay R4470X and a set of reading contacts 4434X; the monitor unit 4450X includes a perforating magnet M4453X and a sixth position perforating magnet M630.

The operation of the equipment disclosed in Figs. 2 to 6 will be better understood from the following discussion.

*Operation of the incoming line circuit 400X in sensing a start-of-message designation*

In response to a telegraph message being transmitted over the incoming line L101, the tape reperforator 330X is operated to record on the tape 333X the start-of-message designation which normally precedes any of the other information included in the telegraph message. As previously pointed out the start-of-message designation normally comprises the seven characters (XZXZXZX). Responsive to the tape being perforated and fed through the tape reperforator 330X, the clutch magnet M344X of the tape reader 340X is operated as the tape is fed therethrough to sense the characters perforated on the tape. Accordingly, when the first character X of the start-of-message designation is sensed the contacts 202, 204, 205 and 206 in the tape reader 340X are simultaneously closed to operate the "X" relay R235 in the set of pre-sensing relays 200 over a circuit extending from ground via contacts 202, 212, the winding of the relay R235, contacts 218, 204, 220, 222, 205, 224, 226, 206 and 228 to resistance battery. It will be noted that at this time the relay R230 is short circuited via the contacts 204 to prevent its operation. Also, in response to the operation the clutch magnet M344X, the contacts 201 are closed thereby completing a circuit from ground potential via the contacts 201, the reading cycle conductor RC and the winding of relay R470X to battery potential whereby the relay R470X is operated. At this time the operation of the relay R470X is ineffective.

The relay R235 upon operating closes at contacts 236 a circuit extending from ground potential via contacts 231 and 236, the conductor 294, and the upper winding of relay R310 to battery potential whereby the relay R310 is operated. The relay 310 upon operating closes contacts 314 thereby to prepare a circuit for operating the relay R320. Thereafter when the clutch magnet M344X and the tape reader 340X is restored the contacts 201 are opened first so that the relay R470X is restored thereby completing at contacts 471 a further point in the circuit for operating the relay R320. At this time the relay R320 is not operated as its upper winding is shunted from ground at contacts 471 to ground at contacts 231. However, shortly thereafter when the contacts 202, 204, 205 and 206 in the tape reader 340X are opened the relay R235 restores thereby interrupting at the contacts 236 the connection to ground potential at contacts 231. Accordingly, the relay R320 is operated in series with the relay R310 from ground potential at the contacts 471 via conductor 292, the upper winding of the relay R320, the contacts 304 and 314 and the upper winding of the relay R310 to battery potential. Upon operating the relay R320 completes at the contacts 322 a circuit previously prepared from ground potential at the contacts 312 by the operation of the relay R310 and via the contact 302 to the connect relay R210 in the set of pre-sensing relays 200 whereby the latter relay is operated. Additionally, the relay R320 prepares at the contact 324 a circuit for operating the relay R330 and prepares at the contact 325 a hold circuit for itself. The connect relay R210 upon operating completes at the contacts 229 a hold circuit for itself extending to multiple ground via contacts 311 and 321. Further, upon operating, the relay R210 interrupts the contacts 212, 214, 216, 218, 220, 222, 224, 226 and 228 thereby disconnecting the pre-sensing relays R230 and R235 from the tape reader 340X; and completes at contacts 211, 213, 215, 217, 219, 221, 223, 225 and 227 connections for operating the set of sensing relays 401X from the tape reader 340X. At this time then the character X has been detected in the message detector 300, the connect relay R210 has been operated, the pre-sensing relays R230 and R235 have been disconnected from the tape reader 340X, and the set of sensing relays 401X have been connected to the tape reader 340X, whereby the detector 300 is now prepared to detect the second character Z in the start-of-message designation.

Thereafter when the clutch magnet M344X of the tape reader 340X is operated during the second reading cycle and senses the second character Z, the contacts 202 and 206 are closed immediately and shortly thereafter the contacts 201 are closed. In response thereto the relay R410X is operated from ground potential via the contacts 202 and 211 and the conductor A, the relay R450X is operated from ground potential via the contacts 225, 206 and 227 and the conductor E, and shortly thereafter the relay R470X is operated from ground potential via the contacts 201 and the conductor RC. In response to the operation of the relays R410X and R450X a circuit is completed from ground potential via the contacts 417X, 427X, 437X, 447X and 457X, the conductor 297, the contacts 390, 325 and 335 to battery potential via the lower winding of the relay R320 whereby the relay R320 is maintained operated. Immediately thereafter and in response to the operation of the relay R470X, ground potential is removed from the conductor 292 at the contact 471 whereby the upper windings of the relays R320 and R310 are deenergized and the relay R310 is restored. Upon restoring the relay R310 completes at the contacts 315 a further point in the circuit for operating the relay R330 via the lower winding thereof. At the end of the sensing cycle the relay R470X restores first thereby causing ground potential to be applied to the conductor 292 at the contact 471 and shortly thereafter the relays R410X and R450X restore so that the relays R320 and R330 are maintained operated from battery potential via the lower winding the relay R320, contacts 324 and 315, the lower winding of the relay R330 and the conductor 292 to ground potential at contacts 471.

Thereafter when the tape reader 340X is operated to sense the third character X of the start-of-message designation, the contacts 202, 204, 205, and 206 are closed immediately and shortly thereafter the contacts 201 are closed thereby to operate relays R410X, R430X, R440X, R450X and shortly thereafter to operate the relay R470X. In response thereto ground potential is applied via the contacts 416X, 426X, 436X, 446X and 456X, the conductor 293, the contacts 387, 332 and 342 and the upper winding of the relay R330 to battery potential; whereby the relay R330 is maintained operated via the upper winding thereof. In response to the operation of the relay R470X the circuit for maintaining the relays R320 and R330 are operated via the lower windings thereof is interrupted at the contacts 471 whereby the relay R320 is restored. Upon restoring, the relay R320 prepares at the contact 323 one point in a circuit for operating the relay R340 via the upper winding thereof. At the end of the reading cycle the relay R470X restores first thereby closing contacts 471 and preparing a circuit operating the relays R330 and R340 in series via the upper windings thereof from ground potential on the conductor 292 and via the upper winding of relay R340, contacts 323 and 333 and the upper winding of the relay R330 to battery potential. Immediately thereafter the relays R410X, R430X, R440X and R450X are restored so that ground is removed from conductor 293 and relays R330 and R340 are operated and the third reading cycle is completed.

Upon sensing the fourth character Z of the start-of-message designation the tape reader 340X causes the contacts 202 and 206 to be closed and shortly thereafter the contacts 201 to be closed whereby the relays R410X and R450X are operated and shortly thereafter the relay R470X is operated. In response to the operation the relays R410X and R450X a circuit previously described is completed for extending ground potential to the conductor 297 which potential is extended via the contacts 390, 345 and 355 through the lower winding of the relay R340 to battery potential whereby the relay R340 is maintained operated in the lower winding thereof. When the relay R470X operates in the fourth reading cycle, the circuit for maintaining the relays R330 and R340 operated via the upper windings thereof is interrupted at the contact 471 whereby the relay R330 restores. Upon restoring the relay R330 prepares the contacts 334 one point in circuit for operating the relay R350 via the lower winding thereof. This operating circuit is further prepared when the relay R470X restores shortly thereafter and applies ground potential to the conductor 292 at the contacts 471. At the end of the reading cycle the relays R410X and R450X are restored so that the ground potential is removed from the conductor 297 whereby the relays R340 and R350 are operated in a series from battery potential via the lower winding of the relay R340, the contacts 344 and 334, the lower winding of the relay R350 to ground potential on the conductor 292.

When the tape reader 340X is operated to sense the fifth character X of the start-of-message designation, the relays R410X, R430X, R440X, and R450X are operated immediately and shortly thereafter the relay R470X is operated. In response thereto and as previously pointed out ground potential is applied to the conductor 293 whereby the relay R350 is maintained operated in its upper winding via the contacts 387, 352, and 362. The operation of the relay R470X interrupts the circuit for maintaining the relays R340 and R350 operated in series via the lower windings thereof whereby the relay R340 is restored and a circuit is prepared at the contacts 343 for operating the relay R360 via the upper winding thereof. At the end of the fifth reading cycle when the relays R410X, R430X, R440X, R450X and R470X are restored the relays R350 and R360 operated in series from battery potential via the upper winding of the relay R350 contacts 353 and 343, the upper winding of the relay R360 to ground potential on the conductor 292.

During the sixth reading cycle when the tape reader 340X senses the character Z, the relays R410X, R450X and R470X are operated in the manner as previously explained. In response to the operation ground potential is applied to the conductor 297 so that the relay R360 is maintained operated from ground potential via the contacts 390, 365, and 374 through the lower winding thereof to battery potential and the circuit for maintaining the relays R350 and R360 operated in series via the upper windings thereof is interrupted as the contacts 471 whereby the relay R350 restores. Upon restoring the relay R350 prepares at the contacts 354 one point in the circuit for operating the relay R370. At the end of the reading cycle when the relays R410X, R450X and R470X are restored the relays R360 and R370 are operated in series in the lower windings thereof from battery potential via the lower winding of the relay R360, contacts 364 and 354, the lower winding of the relay R370 to ground potential on the conductor 292.

During the seventh reading cycle when the tape reader 340X senses the seventh and last character X of the start-of-message designation, the relays R410X, R430X, R440X, R450X and R470X are operated so that ground potential is supplied to the conductor 293 and is removed from the conductor 292. In response to ground potential on the conductor 293 the relay R370 is maintained operated in its upper winding thereof via the contacts 387 and 372; and in response to the removal of ground potential from the conductor 292 the circuit for maintaining the relays R360 and R370 operated in series through the lower windings thereof is interrupted whereby the relay R360 is restored. The relay R360 upon restoring completes at the contact 366 a circuit extending from ground potential via the contacts 374', 366, and 472 through the winding of the punch magnet M241 in the tape reader 340X to battery potential whereby the sixth position character punch 240 is operated to perforate the tape 333X in the sixth character punch position a selected number of positions before the first X of the start-of-message designation and illustrated as four positions in Fig. 8. At the same time the relay R360 upon restoring prepares the contacts 363 a circuit for operating the hold relay R375. At the end of the reading cycle the relays R410X, R430X, R440X, R450X and R470X are restored. Ground potential is removed from the conductor 293 whereby the hold relay R375 is operated at its center winding in series with the upper winding of the relay R370 over a path extending from battery potential through the upper winding of the relay R370 contacts 377, 385, 373 and 363 through the center winding of the relay R375 to ground potential on the conductor C616 DPX. Additionally, when the relay R470X is restored the contacts 472 are opened whereby the sixth character punch 240 is restored. Upon operating the relay R375 completes at the contacts 378 a circuit extending from battery potential via the lower winding of the relay R375 to ground potential on the conductor C616 DPX whereby the relay R375 is maintained operated; and interrupts at contacts 377 the circuit for maintaining the relay R370 operated in series therewith whereby the relay R370 is restored. Additionally, the relay R375 prepares at the contacts 376 a point in the circuit for operating the end-of-message relay R590X.

At this time then the start-of-message designation has been detected in the combination start and end-of-message detector 300 so that the hold relay R375 is operated and the sixth position punch 240 has been operated to perforate the tape 333X with a start-of-message designation; also the relays R310 to R370, inclusive, are restored whereby ground potential is removed from the conductor 290 extending to the connect relay R210 in the set of pre-sensing relays 200 so that the last named relay is restored. Upon restoring the relay R210 disconnects the set of sensing relays 401X from the tape reader 340X and connects the relays R230 and R235 of the set of pre-sensing relays 200 to the tape reader 340X. The set of sensing relays 401X and the start and end-of-message detector 300 are now rendered ineffective until the characters "Fig." followed by a "comma," characteristic of the first two characters of an end-of-message designation, are sensed at the tape reader 340X.

At this time the tape reader 340X is selectively operative in accordance with the operation of the clutch magnet M344X to detect other control characters of the groups of control characters included in the telegraph message. After the body of the telegraph message has been fed through the tape reader 340X the clutch magnet M344X is again controlled in a manner as explained in the above mentioned copending application to Stiles to sense the end-of-message designation.

*Operation of the line circuit 400X in sensing an end-of-message designation*

It is assumed in accordance with the description given above that the portion of the tape including the body of the telegraph message has been fed through the tape reader and the relay R375 in the combination start and end-of-message detector 300 is operated and that the relays R230 and R235 of the set of pre-sensing relays 200 are connected to the control contacts of the tape reader 340X.

When a "Fig." character is sensed by the tape reader 340X the contacts 202, 203, 205 and 206 are closed to operate the "Fig." relay R230 over a circuit extending from ground potential via contacts 202, 212, 214, 203, and 216, through the winding of the relay R230, and via contacts 222, 205, 224, 226, 206 and 228 to resistance battery. Contacts 201 also close a short time thereafter to operate the relay R470X over an obvious circuit. The relay R230 upon operating closes at contacts 232 a circuit for extending ground potential via the contacts 232 and 237, the conductor 295 and the contacts 388 through the winding of the "Fig." relay R300 to battery potential in the combination start and end-of-message detector 300. The relay R300 upon operating prepares at contacts 305 a circuit for operating the relay R310 and prepares at the contacts 301 a circuit for operating the connect relay R210 in the set of presensing relays 200 and prepares at the contacts 303 a circuit for operating the transfer relay R380 in the combination of start and end-of-message detector 300. At the end of the reading cycle the operated relays R230 and R470 are restored so that the relays R300 and R310 are operated in series over a circuit extending from ground potential via the contacts 471 and conductor 292 the lower winding of the relay R310, contacts 305 and the winding of the relay R300 battery potential. The relay R310 upon operating completes at the contacts 312 an obvious circuit for operating the connect relay R210 and for operating the transfer relay R380, and applies ground potential at the contacts 311 to the conductor 290 extending to the hold circuit for the connect relay R210. The relay R210 upon operating closes contacts 229 thereby completing a hold circuit for itself to ground potential on the conductor 290 and as previously described disconnects the relays R230 and R235 in the set of pre-sensing relays R200 from the tape reader 340X and connects the relays R410X, R420X, R430X, R440X, and R450X in the set of sensing relays 401X to the tape reader 340X. The relay R380 upon operating completes at contacts 381 a hold circuit for itself to ground potential on the conductor 290, prepares at contacts 382 a further point in the circuit for operating the end-of-message relay R590X, and closes contacts 386 and 389 for connecting the conductor 296 to the combination started end-of-message detector 300.

Thereafter when the tape reader 340X senses the first comma (,) of the end-of-message designation, the contacts 204 and 205 are closed and shortly thereafter the contacts 201 are closed to operate the corresponding relays R430X, R440X and R470X. The relays R430X and R440X upon operating complete a circuit for extending ground potential via the contacts 415X, 425X, 435X, 445X and 455X, the conductor 296, the contacts 386, 313 and 326, and the upper winding of the relay R310 to battery potential whereby the relay R310 is operated. Shortly thereafter when the relay 470X is operated, ground potential is removed from the conductor 292 at the contacts 471 whereby the circuit for operating the relays R300 and R310 in series is interrupted so that the relay R300 restores. The relay R300 upon restoring prepares at the contacts 304 a circuit for operating the relay R320.

In response to the sensing of the next five commas at the tape reader 340X, the start and end-of-message detector 300 is operated in the same manner as it was in response to the second, third, fourth, fifth and sixth characters of the start-of-message designation, so that at the end of the sensing of the sixth comma, the relays R360 and R370 are held operated in series and the relays R300, R310, R320, R330, R340 and R350 are restored.

Thereafter when the tape reader 340X senses the seventh and last comma of the end-of-message designation the relays R430 and R440X are operated and shortly thereafter the relay R470X is operated. In response to the operating of the relays R430X and R440X ground potential is applied to the conductor 296 in a manner as previously explained and extended via the contacts 386 and 372 through the upper winding of the relay R370 to battery potential whereby the relay R370 is maintained operated through its upper winding. In addition, ground potential on the conductor 296 is extended via the contacts 386, 372, 376, and 382 and the upper winding of the relay R590X to battery potential so that at this time the end-of-message relay R590X is also operated. The relay R470X upon operating interrupts at the contacts 471 the circuit for maintaining the relays R360 and R370 operated in series so that the relay R360 restores; whereupon ground potential is extended via the contacts 374', 366 and 472 to the punch magnet M241 of the sixth position character punch 240 in the tape reader 340X and the punch 240 is operated to perforate the tape 333X in an end-of-message character as shown in Fig. 8. The relay R590X upon operating closes contacts 596X for completing a hold circuit therefor through the lower winding thereof and interrupts contacts 597X to remove ground potential from the conductor C616DPX; whereby the relay R375 restores a short time thereafter, it being of the slow to release type.

At the end of this reading cycle the relays R430X, R440X, and R470X of the set of sensing relays 401X restore and the relay R370 follows thereby removing ground potential from the conductor 290 and causing the connect relay R210 and the transfer relay R380 to restore. Accordingly, the set of sensing relays 401X are disconnected from the tape reader and the pre-sensing relays R230 and R235 are again connected to the tape reader 340X.

Thus at this time the start-of-message designation has been detected from the tape and a start-of-message character has been punched in the tape at a position immediately preceding the characters of the start-of-message designation perforated in the tape and in the sixth character punch position, the portion of the tape carrying the message body has been fed through the tape reader 340X, the end-of-message designation has been detected in the detector 300 and an end-of-message designation has been perforated in the tape at a position immediately preceding the characters of the end-of-message designation perforated in the tape and in the sixth perforate position, the set of pre-sensing relays 200 and the set of sensing relays 401X are in their normal positions, and the combination start and end-of-message detector 300 is in its normal position except that the end-of-message relay R590X therein is operated. The latter relay is held operated until the incoming line circuit 400X is released subsequent to the message being transmitted to a cross-office unit.

The portions of the incoming line circuit 400X illustrated in Figs. 2 and 3 is substantially identical to the portions of the incoming line circuit 400X disclosed in the applicant's copending application Serial No. 491,465, filed March 1, 1955, now U.S. Patent No. 2,779,816, and further operation thereof with regard to sensing characters in the start and end-of-message designations out of order and with regard to sensing the start-of-message designations and the end-of-message designations out of order will be understood by reference to the applicant's above mentioned copending application.

At this time then the complete telegraph message has been fed through the tape reader 340X and is prepared to be fed through the incoming line transmitter 360X in order to cause signals corresponding to the message perforated thereon to be transmitted via the cross-office selector 3300X to the selected cross-office units 3400X.

*The operation of the line transmitter 360X in transmitting the telegraph message*

When the incoming line transmitter 360X is activated, the clutch magnet M364X is operated to control the sensing contacts 481 to 488, inclusive, for closure and to feed the tape 333X past the sensing contacts. At this time only the contacts 482 to 486, inclusive, are effective for causing transmission of the signals and in response to the operation of the magnet M364X and the feed of tape will transmit signals corresponding to the "space" character perforations which precede the start-of-message designation via contacts 467 of the off normal switch 465, conductor C498, switch S461 of the cross-office selector 3300X and the winding of the perforating magnet M3411X of the tape reperforator 3410X in the cross-office unit 3400X to battery potential whereby the tape reperforator 3410X is operated to perforate the tape 3413X in accordance with the transmitted signals and to feed the tape 3413X therethrough. Thereafter when the contacts 488 are closed in response to the sensing of a sixth position start-of-message designation, ground potential is applied to the conductor SP which is extended via contacts 499 and the winding of the magnet MM489 associated with sequence switch SS489 to battery potential and via the upper winding of the control relay R490 to battery potential and via contacts 495 of the off-normal switch ON493, conductor C497, the switch S460 in the cross-office selector 3300X and the winding of sixth position perforating magnet M501 in the tape reperforator 3410X of the cross-office unit 3400X to battery potential. Thereupon the magnet MM489 is energized but not operated as it is of the operate-upon-release type, the relay R490 is operated and the magnet M501 is operated to cause the tape 3413X in the tape reperforator 3410X to be perforated in the sixth position and to be advanced one space.

The relay R490 upon operating closes contacts 491 thereby connecting the contacts 481 via the conductor RC to selected terminals of the sequence switch SS489, closes contacts 492 to prepare a hold circuit for maintaining the relay R490 operated and opens contacts 499. The contacts 499 upon opening releases the energized magnet MM489 whereby in the sequence switch SS489 the wiper is stepped in a counter-clockwise direction from its home or first terminal into engagement with the second terminal. Upon being stepped from the first to the second terminal the wiper of SS489 causes the off-normal switch ON465 to be operated for opening contacts 467 and thereby disconnect sensing contacts 482 to 487, inclusive, from the conductor C498 and to close contacts 466 for connecting the winding of the magnet MM489 in parallel with the clutch magnet M364X so that the two magnets are energized simultaneously. Also the switch SS489 in stepping to its second terminal operates the off-normal switch ON493 to close contacts 494 and 496 and to open contacts 495. Accordingly the relay R490 is maintained operated from ground potential via a circuit including contacts 496 and 492 and the lower winding thereof to battery potential and the conductor C497 is connected at contacts 494 to the wiper of the sequence switch SS489. Additionally and during the time that the above action is taking place the line transmitter completes the reading cycle so that the clutch magnet M364X is restored and is prepared to commence another reading cycle. When the clutch magnet M364X is operated thereafter ground potential is extended via the contacts 481, 491, the second terminal of the sequence switch SS489 and the wiper thereof, contacts 494, conductor C497 and the switch S460 of the cross-office selector 3300X to the perforating magnet M501 in the tape reperforator 3410X. Thereupon the perforating magnet M501 is operated to perforate a second sixth position start-of-message character in the tape 3413X. At the end of the second reading cycle the clutch magnet M364X restores and the motor magnet M489 is operated to step the sequence switch SS489 to its third terminal which is open. Accordingly during the third reading cycle no pulses are sent to the perforating magnet M501 in the tape reperforator 3410X. During the subsequent eight reading cycles ground potential may be applied to the perforating magnet M501 in a predetermined manner in order to identify the incoming line circuit transmitting to the tape reperforator 3410X in the cross-office unit 3400X. In accordance with the connection shown for the terminals of the sequence switch SS489A in Fig. 4 the perforating magnet M501 will be operated eight consecutive times to perforate an incoming line identification in the sixth perforate position on the tape 3413X. Thus, as described, the tape 3413X will include in the sixth perforate position two consecutive perforations indicating a start-of-message followed by a space and then eight consecutive perforations identifying the incoming line circuit 400X. At the end of the eleventh reading cycle when the sequence switch SS489 is operated into its twelfth position the sequence switch ON465 is operated to interrupt at contacts 466 the circuit for operating the motor magnet MM489 and to close the contacts 467 for connecting the sensing contacts 482 to 487, inclusive, to the conductor C498 extending to the cross-office selector 3300X. At the same time the off normal switch ON493 is restored to normal so that the control relay R490 is restored. Thereafter the incoming line transmitter 360X continues to read the telegraph message on the tape 333X and to send signals corresponding thereto via the conductors C498 and the switch S461 of the cross-office selector 3300X to control the perforating magnet M3411X in the tape reperforator 3410X of the cross-office unit 3400X.

At the end of the telegraph message body, when a sixth position end-of-message character is sensed on the tape 333X in the transmitter 360X at the contacts 488, ground potential is applied to the conductor SP whereby the motor magnet MM489 is energized and the relay R490 is operated and a ground pulse is extended via the contacts 495 to the perforating magnet M501 in the cross-office unit 3400X, in a manner as previously explained, whereby the motor magnet MM489 is operated to step the wiper of the sequence switch SS489 to engage the thirteenth terminal thereof and the off-normal contacts 468 are closed to connect the magnet MM489 in parallel with M364X, and the off-normal switch ON493 is operated to open contacts 495 and to close contacts 494 and 496.

Accordingly during the next reading cycle ground potential is extended from contacts 481 via the conductor RC, contacts 491, the thirteenth terminal and the wiper of SS489 to cause the perforating magnet M501 in the tape reperforator 3410X to operate and perforate a second consecutive sixth position perforation in the tape 3413X and signals corresponding to the character sensed by the contacts 482 to 487, inclusive, are transmitted via contacts 467 and conductor C498 to the perforating magnet M3411X in the reperforator 3410X. The latter character, and as shown from Fig. 8, is a "carriage return" character. At the end of the reading cycle the wiper of SS489 is stepped to its fourteenth terminal. During the next reading cycle no signals are sent to the magnet M501 but signals corresponding to a 'carriage return" character is sent to the magnet M3411X. Thereafter, and for the next eight reading cycles no signals are sent over the conductor C497 but signals corresponding to the end-of-message designation (Fig. ,,,,,,,,) are sent over the conductor C498 so that the magnet M3411X perforates the end-of-message characters in the tape 3413X of the cross-office register. At the end of this transmission operation of the clutch magnet M364X ceases, the wiper of the sequence switch is stepped into engagement with its first terminal, contacts 468 are opened, the off-normal switch OM493 is operated to close contacts 495 and open contacts 494 and 496 and the relay R490 is restored.

At this time the telegraph message stored in the incoming line circuit 400X is transmitted to the cross-office unit 3400X and the incoming line circuit is controlled therefrom and released, whereby the relay R590X in the combination start and end-of-message detector 300 is restored and all of the equipment in the incoming line circuit 400X is normal and prepared to receive another telegraph message. The operation on the cross-office unit 3400X in processing the message transmitted thereto and in preparing the message for transmission over the outgoing line LIX is considered hereinafter.

*Operation of the tape reader 3420X and control circuits 120*

In the tape reader 3420X, when sufficient tape has been perforated by the tape reperforator 3410X, the tape 3413X becomes slack and causes the tape switch 3427X to close its contacts 3422X thereby causing the operation of the clutch magnet M3425X in the tape reader 3420X in a manner as described in detail in the Stiles patent. The clutch magnet M3425X upon operating starts a reading cycle and closes the contacts 502 for applying ground potential to the conductor RC during each operation thereof and closes the contacts 503 when a perforation is sensed in the sixth perforate position of the tape 3413X, whereby ground potential is applied to the conductor SP. Prior to the contacts 503 being closed, the application of ground potential to the conductor RC is of no effect as is understood from the following disclosure.

When the contacts 503 are closed in response to the sensing of a sixth position perforation ground potential is applied to the conductor SP so that the relay R520 is operated thereover via contacts 532 and the winding thereof to battery potential. Upon operating relay R520 closes contacts 522 thereby operating the control relay R505 from ground potential on the conductor RC, and closes contacts 523. The operated relay R505 closes contacts 506 thereby completing a hold circuit for itself to the conductor RC and connecting ground potential on the conductor RC through the winding of the reading cycle relay R510 to battery whereby R510 is operated. The relay R510 upon operating completes at the contacts 511 a circuit for extending ground potential via the contacts 511, 523, 551 and 573 through the winding of the motor magnet MM581 to battery potential, whereby the motor magnet is energized but not operated as it is of the operate-upon-release type. At the same time ground potential is applied via the contacts 511 and 523 to the wiper of the sequence switch SS580 which is at this time in contact with an open terminal thereof. Also at this time the operated relay R520 has prepared at the contacts 521 a circuit for operating the relays R520 and R530 in series.

At the end of the first reading cycle when the contacts 502 and 503 are opened, the reading cycle relay R510 is restored though the relay R505 remains operated as it is of the slow-to-release type, and the relays R520 and R530 are operated in series from battery potential via the winding of the relay R520, the contacts 521, the winding of the relay R530 and contacts 553 to ground potential. The relay R530 upon operating prepares at the contacts 531 a circuit for operating the relay R540. The restoring of the relay R510 removes ground potential from the winding of the motor magnet MM581 whereby the wiper of the sequence switch SS580 is stepped in a clockwise direction into engagement with the second terminal thereof and the contacts of the off-normal switch ON575 are closed. During the second operation of the clutch magnet M3425X and assuming that the contacts 503 sense a second perforation in the sixth perforate position on the tape 3413X, thereby indicating a start-of-message designation, ground potential is applied to the conductors RC and SP whereby the reading cycle relay R510 is operated via the contacts 506 and the relay R540 is operated from ground potential on the conductor SP via the contacts 531 and 555 and through the winding thereof to battery potential. The relay R540 upon operating prepares at the contacts 541 a circuit for operating the relays R540, R550 and R565 in series and opens at contacts 542 a circuit for operating the alarm relay R560. At the end of this second reading cycle when the contacts 502 and 503 are opened, the reading cycle relay R510 is restored thereby operating the motor magnet MM581 and causing the wiper of the sequence switch SS580 to step into engagement with the third terminal thereof and the relay R540 is operated in series with the relays R550 and R565 from battery potential via the winding of R540, contacts 541, the winding of the relay R550, the upper winding of R565 and the contacts 566 to ground potential. The relay R550 upon operating open contacts 553 for interrupting the circuit for operating the relays R520 and R530 whereby the latter relays restore. The relay R565 upon operating closes contacts 567 for completing a hold circuit therefor from ground potential via contacts 571 and 567 and the lower winding of R565 to battery and opens at contacts 566 the circuit for energizing the upper winding thereof and for operating relays R540 and R550 whereby the latter relays restore, and closes contacts 574 to prepare a circuit for the sequence switch SS580. Shortly thereafter the slow-contacts 568 are closed thereby preparing a circuit for operating the relay R550 from ground potential via contacts 571 and 568. During the third operating cycle only the contacts 502 are closed whereby the reading cycle relay R510 is operated. The relay R510 upon operating closes contacts 511 thereby extending ground potential via contacts 574 and the wiper of the sequence switch SS580 and the third terminal thereof to the space character relay R3820X and extending ground potential to the motor magnet MM581 operating the wiper of the sequence switch SS580. The relay R3820X upon operating interrupts the circuit for operating the clutch magnet M3425X in the tape reader 3420X in the manner as explained in the Stiles application so that the contacts 502 therein are opened, the reading cycle relay R510 is restored and the relay R505 is restored shortly thereafter and the motor magnet MM581 is operated to step the wiper of the sequence switch SS580 into contact with its fourth terminal. At this time the operation of the tape reader 3420X and of the start and end-of-message detector 500 is interrupted until the outgoing line LIX is determined to be idle and to be available for transmission.

When the outgoing line LIX is prepared to transmit telegraph signals thereover the test guard relay R3940X in the control circuits 120 of the cross-office unit 3400X is operated and in response thereto the control relay R4470X in the number transmitter 4430X is operated and prepares a circuit for operating the clutch magnet M3425X in the tape reader 3420X; however the clutch magnet is not operated at this time. In response to the operation of the control relay R4470X in the number transmitter 4430X the magnet M4433X is operated. Upon operating the magnet M4433X closes contacts 621 thereby completing an obvious circuit for operating the relay R600 in the control circuits 120 of the cross-office unit 3400X and also controls the number transmitter 4430X to transmit a start-of-message designation comprising the seven characters XZXZXZX, a two or three character line identifying designations, and a three digit channel number indicator. In the interval immediately prior to the operation of the number transmitter the relay R600 in the control circuits 120 closes contacts 603 and 605 thereby to prepare a circuit extending from ground potential via the contacts 605, the switch S613 of the outgoing selector 4300X, the contacts 4434X of the number transmitter 4430X, the winding of the send relay R4440X, the switch 612 of the outgoing selector 4300X and contacts 603 to resistance battery for operating the send relay R4440X in accordance with the signals sent from the number transmitter 4430X. The relay R600 also opens the contacts 601 thereby to prevent the punch magnet M4453X in the monitor unit 4450X from operating during this sending period. In addition, the relay R600 closes contacts 607 and 608 to complete a circuit extending from ground potential via the contacts 607, the conductor C602, the wiper and the fourth to tenth contacts, inclusive, of the sequence switch S580, the conductor C609, contacts 608, the switch S615 of the outgoing selector 4300X, and the winding of the sixth position perforator M630 in the monitor unit 4450X to battery potential. In addition, ground potential on the conductor C602 is extended via the off-normal contacts ON575, the interrupting contacts 582 and the winding of the motor magnet MM581 to battery potential, whereby the motor magnet is energized thereby interrupting the contacts 582 so that the magnet is operated and the wiper of the sequence switch SS580 is stepped from the fourth terminal into engagement with the fifth terminal thereof. In this manner the sixth position punch in the monitor unit 4450X is operated to perforate a cross-office unit identification number in the tape of the monitor unit 4450X during the same interval that the number transmitter 4430X is transmitting the seven character start-of-message designation over the outgoing line LIX. Thus the wiper of the sequence switch SS580 steps into engagement with the tenth terminal thereof and sends a ground pulse out over the conductor C609 at the same time that the number transmitter is transmitting over the outgoing line LIX the last X in the start-of-message designation XZXZXZX. Thereafter the number transmitter 4430X continues to operate in order to send out over the outgoing line LIX a line identifying indication and a channel number indication, but the double wiper of the sequence switch SS580 is stepped from engagement with the tenth terminal thereof into its home position thereby opening the off-normal contacts ON575 and preventing further operation of the motor magnet MM581.

After the channel number indication has been transmitted from the number transmitter 4430X, the magnet M4433X is restored thereby interrupting the circuit for maintaining the relay R600 operating and causing the previously prepared operating circuit for the clutch magnet M3425X to be completed so that the clutch magnet M3425X in the tape reader 3420X is energized and operated. Upon restoring the relay R600 completes at contacts 601, 604 and 606 a circuit for operating the send relay R4440X in series with the porforating magnet M4453X in the monitor unit 4450X extending from ground potential via the reading contacts 3490X in the outgoing line transmitter 3430X, conductor C610, contacts 606, the switch S613 of the outgoing selector 4300X, the first and normally closed contact of the reading contacts 4434X in the number transmitter 4430X, the winding of the relay R4440X, the switch S612 of the outgoing selector 4300X, contacts 604 and 601, the switch S611 of the outgoing selector 4300X and the winding of the magnet M4453X to battery potential. During the interval that the number transmitter 4430X was transmitting signals over the outgoing line LIX, the tape 3413X of the cross-office unit 3400X was fed through the tape reader 3420X and the outgoing line transmitter 3430X a predetermined number of spaces to align the portion of the telegraph message to be transmitted from the transmitter 3430X with the reading contacts 3490X thereof. At this time then the portion of the telegraph message to be transmitted is aligned with the reading contacts 3490X, the clutch magnet M3425X is operated, and the perforating magnet M4453X and the monitor unit 4450X is connected in series with the send relay R440X for operation from the reading contacts 3490X of the outgoing line transmitter 3430X.

*Operations in the cross-office unit 3400X for transmitting the telegraph message therefrom*

When the magnet M3425X is operated it completes an obvious circuit at its contacts 3426X for operating the magnet M3427X of the outgoing line transmitter 3430X. As long as the magnet M3425X is in its operative position, the tape reader 3420X continues to sense and feed the tape 3413X to the outgoing transmitter 3430X and as long as the magnet M3427X is operated the outgoing line transmitter 3430X senses the tape fed thereto and transmits signals corresponding to the telegraph message over the conductor C610. It will be appreciated that in spite of the operation of the clutch magnet M3425X at this time the start and end-of-message detector 500 is not operated and the tape is fed past the contacts 502 and 503 without effect until the contacts 503 are closed at the time that a sixth position perforation corresponding to the end-of-message designation is sensed in the tape 3413X. It is understood that in the course of each sending cycle in the outgoing line transmitter 3430X the contacts illustrated as normally closed in the reading contacts 3490X are first opened and the remaining contacts thereof are sequentially closed and reopened and finally the normally closed contacts thereof are reclosed. Accordingly, during each reading cycle ground pulses correspond into the perforations in the tape aligned with the reading contacts 3490X are transmitted via the conductor C610, the contacts 606, the switch 613, the normally closed contacts of the reading contacts 4434X, the winding of the relay R4440X, the switch S612, contacts 604 and 601, the switch S611, and the winding of the magnet M4453X to battery potential; whereby the send relay R4440X and the magnet M4453X are operated in series by each ground pulse transmitted thereover.

As the outgoing line transmitter 3430X continues to sense the tape and to send signals over the conductor C610 so also does the tape reader 3420X sense the tape 3413X but only for sixth position perforations. When the first end-of-message character in the sixth perforate position of the tape 3413X is detected, the contacts 503 are closed and, in a manner as previously explained, ground potential is extended via the conductor SP and the contacts 532 to operate the relay R520 in the detector 500. Upon operating the relay R520 prepares at the contacts 521 a circuit for operating the relays R520 and R530 in series and closes at contacts 522 a circuit for operating the control relay R505 from ground potential via the reading contacts 502; whereby the contacts 506 are closed and ground potential from the contacts 502 is extended to the reading cycle relay R510 causing the latter relay to operate. Thereupon contacts 511 are closed and ground potential is extended to the motor magnet MM581 thereby energizing the last named magnet. At the end of the reading cycle the relay R510 is restored, the relay R505 is maintained operated as it is of the slow release type and the relays R520 and R530 are operated in series from battery potential via the winding of the relay R520, contacts 521, the winding of the relay R530 and contacts 553 to ground potential. When the second sixth position perforation is detected in the tape reader 3420X, contacts 502 and 503 are closed, whereby the relay R510 is operated and the relay R540 is operated. At the end of this second reading cycle the relay R510 is restored and the relays R540 and R550 are operated in series from battery potential via the winding of the relay R540, the contacts 541, the winding of the relay R550, and contacts 568 and 571 to ground potential. Upon operating the relay R550 opens at contacts 553 the circuits for maintaining the relays R520 and R530 operated and completes at the contacts 556 a circuit extending from ground potential via the contacts 556, 563, and 569 through the upper winding of the end-of-message relay R3810X to battery potential whereby the latter relay is operated. Upon operating the relay R3810X locks itself by the way of a circuit from battery via its lower winding and the contacts 3814X to ground potential and opens at contacts 571 the circuit for maintaining the hold relay R565, and the relays R530 and R550 operated whereby the last named relays restore. Additionally, the operated relay R3810X closes contacts 576 to complete a circuit via the off-normal contacts ON575 for stepping the wiper of the sequence switch SS580 into its home position whereupon the contacts ON575 are opened and the operating circuit interrupted. The stepping of the wiper of SS580 across its terminals is of no consequence inasmuch as relay R3820X connected to one of the terminals is operated and the conductor C609 connected to others of the terminals is open at contacts 608. Further, the operated relay R3810X indicates to the cross-office unit that the end-of-message has been sensed by the tape reader 3420X. In response thereto the tape 3413X is stepped a predetermined number of spaces in order to complete transmission of the message including the end-of-message designation through the outgoing line transmitter 3430X. During this interval the reading cycle relay R510 is operated, but its operation is inconsequential inasmuch as the contacts 523 and 574 are opened. When the tape 3413X has been stepped the predetermined number of spaces, the circuit for operating the control relay R4470X is interrupted whereby the last named relay restores thereby causing the clutch magnet M3425X to restore. In addition the test guard relay R3940X is restored thereafter causing the relays R3910X, R3810X and R3820X to be restored also. At this time the telegraph message has been transmitted over the outgoing line LIX and the necessary information thereof has been perforated in the tape of the monitor unit 4450X, the outgoing line LIX and its associated number transmitter 4430X and the monitor unit 4450X has been released and made available to any other cross-office unit, and the cross-office unit 3400X has been released and restored to normal and prepared to be seized by any other incoming line circuit having a telegraph message therein.

*Operation of the detector 500 in response to a faulty start or end-of-message designation*

Assuming now that the reader contacts 503 in the tape reader 3420X have been closed in response to the tape reader sensing a first sixth position perforation corresponding to the start-of-message designation, the relays R520, R505, and R510 are operated in a manner as previously described. At the end of the sensing cycle the contacts 502 and 503 are opened whereupon the relay R510 restores, the relay 505 remains operated and the relay R520 is operated in series with the relay R530 from battery potential via the winding of the relay R520, contacts 521, the winding of the relay R530 and contacts 553 to ground potential. Assuming further that the tape 3413X does not have therein the second consecutive sixth position perforation which normally completes a proper start-of-message designation, during the next reading cycle of the tape reader 3420X only the contacts 502 are closed whereby the relay R510 is operated and a circuit is completed from ground potential for operating the alarm relay R560 and extending via the contacts 512, 533 and 542 through the upper winding of the relay R560 to battery potential. Upon operating the relay R560 closes at the contacts 561 a circuit extending from ground potential via the off-normal contacts ON575, and the interrupting contacts 582 to the motor magnet MM581 whereby the wiper of the sequence switch SS580 is stepped through its cycle to its home position whereupon the off-normal contacts ON575 are opened and operation of the motor magnet MM581 is interrupted. The operation of the sequence switch SS580 at this time is ineffective because, as previously explained, the contacts 608 are not closed. In addition the alarm relay R560 closes contacts 564 for extending ground potential to the space character relay R3820X whereby the latter relay is operated to cause operation of the clutch magnet M3425X and the tape reader 3420X to be interrupted so that operation of the tape reader 3420X is halted. Further the relay R560 upon operating closes at contacts 562 a hold circuit for itself extending from battery potential via the lower winding of the relay R560, contacts 562 and an alarm device (not shown) to ground potential whereby the relay R560 is maintained operated in series with the alarm device and an indication of a fault condition in the detector 500 of the cross-office unit 3400X is rendered in the switching center 100. Accordingly, operation of the cross-office unit 3400X is interrupted pending the discovery and the repair of the fault condition by the station attendant whereupon ground potential is removed from the relays R520, R530 and R560 and the last named relays restored causing the control relay R505 to restore. At this time then the start and end-of-message detector 500 is restored to normal and is prepared to respond to a proper start-of-message designation.

Assuming now that the tape reader 3420X has sensed a proper start-of-message designation so that the relay R565 in the detector 500 is operated and that thereafter the contacts 503 are closed in response to the sensing of a first sixth position perforation corresponding to an end-of-message designation, the relays R520, R505 and R510 are operated in a manner as previously described. At the end of the sensing cycle the relay R510 restores and the relays R520 and R530 are operated in series over the previously traced path. Assuming further that the tape 3413X does not have therein the second consecutive sixth position perforation normally completing a proper end-of-message designation, during the next reading cycle of the tape reader 3420X only the contacts 502 are closed so that relay R510 operates and completes the previously traced circuit for operating the alarm relay R560 through its upper winding. As previously described the relay R560 upon operating causes the wiper of the sequence switch SS580 to step to its home position, completes a hold circuit for itself and operates an alarm device visible in the switching center 100, and also interrupts at the contacts 563 a point in a circuit for operating the end-of-message relay R3810X. Upon discovery and repair of the fault condition the attendant at the switching center 100X may by manual means either complete operation of the detector circuit 500 so that the end-of-message relay R3810X is operated or restore the relays R520, R530 and R560, maintaining the relay R565 operated, so that the detector circuit 500 is in condition to respond again to a proper end-of-message designation, or restore all of the operated relays so that the detector 500 is restored to normal and is prepared to respond to the start-of-message designation of the next telegraph message perforated on the tape 3413X.

From the foregoing it is clear that there has been provided an improved telegraph switching center arrangement in which certain standard time consuming detection operations with regard to each telegraph message are completed at the incoming line circuits in the switching center and are authenticated thereat and thereafter the equipment handling the authenticated message detects only for the authentications whereby the speed with which a message is processed through the switching center is greatly increased.

While the authentication operations are described herein as being performed in the tape reader of the incoming line circuit it is clear that detection equipment could be provided at the tape reperforator of the incoming line circuit and authentication could be performed thereat as the message signals are received. Additionally, and though the described arrangement is preferred, it is understood that the transmission from the incoming line transmitter of signals corresponding to the individual characters of the end-of-message designation and signals corresponding to the sixth position perforation, as described herein, is arbitrary and that the incoming line transmitter may be adapted to transmit for the end-of-message designation only the signals for the corresponding sixth position perforation and the outgoing line circuit may be adapted to transmit over the outgoing line signals corresponding to the individual characters of the end-of-message designation in response to the detection therein of the sixth position perforations corresponding to the end-of-message designation.

While there has been described what is believed to be the preferred embodiment of the invention and alternative modifications thereof, it will be understood that various other modifications may be made therein, and it is intended to cover in the appended claims all such modifications as fall within the true spirit and scope of the invention.

What is claimed is:

1. In a telegraph switching center for receiving telegraph message character signals on a line incoming thereto and for retransmitting telegraph message character signals over a line outgoing therefrom, wherein each telegraph message includes a plural character message body preceded by a predetermined plural character start-of-message designation and followed by a predetermined plural character end-of-message designation; the combination comprising, an incoming line circuit terminating said incoming line, an outgoing line circuit terminating said outgoing line, a trunk line including a line conductor and a control conductor completing a connection between said incoming line circuit and said outgoing line circuit, means included in said incoming line circuit responsive to telegraph message character signals received over said incoming line for making a record of said telegraph message and responsive to telegraph message character signals corresponding to said predetermined plural character start-of-message designation for transmitting over the control conductor of said trunk line a different first control signal and a group of incoming line identity signals and responsive to telegraph message character signals corresponding to said plural character message body for transmitting over the line conductor of said trunk line corresponding telegraph message character signals and responsive to telegraph message character signals corresponding to said predetermined plural character end-of-message designation for transmitting over the control conductor of said trunk line a different second control signal, and means included in said outgoing line circuit responsive to a said telegraph message character signals and to said first and second control signals and to said group of line identity signals on the conductors of said trunk line for making a record of said telegraph message and responsive to said first control signal on said control conductor for transmitting over said outgoing line telegraph message character signals corresponding to said predetermined plural character start-of-message designation and responsive to said telegraph message character signals on said line conductor for transmitting over said outgoing line telegraph message character signals corresponding to said plural character message body and responsive to said second control signal on said control conductor for transmitting over said outgoing line telegraph message signals corresponding to said predetermined plural character end-of-message designation.

2. In a telegraph switching center for receiving telegraph message character signals on a line incoming thereto and for retransmitting telegraph message character signals over a line outgoing therefrom, wherein each telegraph message includes a plural character message body preceded by a predetermined plural character start-of-message designation and followed by a predetermined plural character end-of-message designation; the combination comprising, an incoming line circuit terminating said incoming line, an outgoing line circuit terminating said outgoing line, a trunk line including a line conductor and a control conductor completing a connection between said incoming line circuit and said outgoing line circuit, means included in said incoming line circuit responsive to telegraph message character signals received over said incoming line for making a record of said telegraph message and responsive to telegraph message character signals corresponding to said predetermined character start-of-message designation for transmitting over the control conductor of said trunk line a different first control signal and a group of incoming line identity signals and responsive to telegraph message character signals corresponding to said plural character message body for transmitting over the line conductor of said trunk line corresponding telegraph message character signals and responsive to telegraph message character signals corresponding to said predetermined plural character end-of-message designation for transmitting over the line conductor of said trunk line corresponding telegraph message character signals and for transmitting over the control conductor of said trunk line a different second control signal, and means included in said outgoing line circuit responsive to said telegraph message character signals and to said first and second control signals and to said group of line identity signals on the conductors of said trunk line for making a record of said telegraph message and responsive to said first control signal on said control conductor for transmitting over said outgoing line telegraph message character signals corresponding to said predetermined plural character start-of-message designation and responsive to said telegraph message character signals on said line conductor for transmitting over said outgoing line telegraph message character signals corresponding to said plural character message body and to said predetermined plural character end-of-message designation and responsive to said second control signal on said control conductor for terminating transmission over said outgoing line only after said telegraph message signals corresponding to said predetermined plural character end-of-message have been transmitted.

3. In a telegraph switching center for receiving telegraph message character signals on a line incoming thereto and retransmitting telegraph message character signals over a line outgoing therefrom wherein each telegraph message includes a plural character message body preceded by a predetermined plural character start-of-message designation and followed by a predetermined plural character end-of-message designation; the combination comprising an incoming line circuit terminating said incoming line and including perforating means responsive to individual character signals transmitted over said incoming line for marking an incoming line tape with corresponding individual character perforations and controlled by a group of individual character signals corresponding to the characters of said start-of-message designation for marking said incoming line tape with a first control perforation and controlled thereafter by a group of individual character signals corresponding to the characters of said end-of-message designation for marking said incoming line tape with a second control perforation, a trunk line including a line conductor and a control conductor extending from said line circuit, and an incoming line transmitter responsive to said individual character perforations in said incoming line tape for transmitting over said line conductor corresponding individual character signals and responsive to said first control perforation and to said second control perforation respectively for transmitting over said control conductor a first control signal and a second control signal; an outgoing line unit associated with said outgoing line and including a character transmitter selectively operative for transmitting over said outgoing line individual character signals corresponding to said start-of-message characters and to said end-of-message characters; and a cross-office unit terminating said trunk line and having access to said outgoing line and to said outgoing line unit and including perforating means responsive to individual character signals on the line conductor of said trunk line for marking a cross-office tape with corresponding individual character perforations and responsive to said first control signal and to said second control signal on the control conductor of said trunk line respectively for marking said cross-office tape with a first control perforation and for working said cross-office tape with second control perforation, detector means for detecting said first control perforation and said second control perforation in said cross-office tape, a selectively operative outgoing line transmitter responsive to said individual character perforations in said cross-office tape for transmitting over said outgoing line individual character signals corresponding to said message body characters, and a transmission controller controlled by said detector in response to the detection of said first control perforation for operating said character transmitter to transmit over said outgoing line individual character signals corresponding to said start-of-message characters and controlled by said character transmitter in response to the completion of said start-of-message transmission for connecting said outgoing line transmitter to said outgoing line and for operating said outgoing line transmitter to transmit over said outgoing line individual character signals corresponding to said message body characters and controlled thereafter by said detector in response to the detection of said second control perforation for disconnecting said outgoing line transmitter from said outgoing line and for operating said character transmitter to transmit over said outgoing line individual character signals corresponding to said end-of-message characters.

4. In a telegraph switching center for receiving telegraph message character signals on a line incoming thereto and retransmitting telegraph message character signals over a line outgoing therefrom wherein each telegraph message includes a plural character message body preceded by a predetermined plural character start-of-message designation and followed by a predetermined plural character end-of-message designation; the combination comprising an incoming line circuit terminating one of said incoming lines and including perforating means responsive to individual character signals transmitted over said incoming line for marking an incoming line tape with corresponding individual character perforations and controlled by a group of individual character signals corresponding to the characters of said start-of-message designation for marking said incoming line tape with a first control perforation in a predetermined position on said tape preceding the first character perforation of said start-of-message designation and controlled thereafter by a group of individual character signals corresponding to the characters of said end-of-message designation for marking said incoming line tape with a second control perforation at a predetermined position on said tape preceding the first character perforation of said end-of-message designation, a trunk line including a line conductor and a control conductor extending from said line circuit, and an incoming line transmitter responsive to said individual character perforations in said incoming line tape for transmitting corresponding individual character signals over the line conductor of said trunk and responsive to said first control perforation for preventing transmission over said line conductor of said start-of-message character signals and for transmitting a first control signal over the control conductor of said trunk and responsive to said second control perforation for preventing transmission over said line conductor of said end-of-message character signals and for transmitting a second control signal over the control conductor of said trunk, whereby said line conductor has transmitted thereover only the message body character signals; an outgoing line unit associated with said outgoing line and including a character transmitter selectively operative for transmitting over said outgoing line individual character signals corresponding to said start-of-message characters and to said end-of-message characters; and a cross-office unit terminating said trunk line and having access to said outgoing line and to said outgoing line unit and including perforating means responsive to individual character signals on the line conductor of said trunk line for marking a cross-office tape with corresponding individual character perforations and responsive to said first control signal and to said second control signal on the control conductor of said trunk line respectively for marking said cross-office tape with a first control perforation and for marking said cross-office tape with a second control perforation, detector means for detecting said first control perforation and said second control perforation in said cross-office tape, a selectively operative outgoing line transmitter responsive to said individual character perforations in said cross-office tape for transmitting over said outgoing line individual character signals corresponding to said message body characters, and a transmission controller controlled by said detector in response to the detection of said first control perforation for operating said character transmitter to transmit over said outgoing line individual character signals corresponding to said start-of-message characters and controlled by said character transmitter in response to the completion of said start-of-message transmission for connecting said outgoing line transmitter to said outgoing line and for operating said outgoing line transmitter to transmit over said outgoing line individual character signals corresponding to said message body characters and controlled thereafter by said detector in response to the detector of said second control perforation for disconnecting said outgoing line transmitter from said outgoing line and for operating said character transmitter to transmit over said outgoing line individual character signals corresponding to said end-of-message characters.

5. In a telegraph switching center for receiving telegraph message character signals on a line incoming thereto and retransmitting telegraph message character signals over a line outgoing therefrom wherein each telegraph message includes a plural character message body preceded by a predetermined plural character start-of-message designation and followed by a predetermined plural character end-of-message designation; the combination comprising an incoming line circuit terminating said incoming line and including an incoming line tape, a first incoming line tape perforator responsive to individual character signals transmitted over said incoming line for marking said incoming line tape with corresponding individual character perforations, a second incoming line tape perforator responsive to a group of individual character perforations in said tape corresponding to the characters of said start-of-message designation and responsive to a group of individual character perforations in said tape corresponding to the characters of said end-of-message designation respectively for marking said incoming line tape with a first control perforation in a predetermined position on said tape preceding first character perforation of said start-of-message designation and for marking said incoming line tape with a second control perforation in a predetermined position on said tape preceding the first character perforation of said end-of-message designation, a trunk line including a line conductor and a control conductor extending from said incoming line circuit, and an incoming line transmitter responsive to said individual character perforations in said incoming line tape for transmitting corresponding individual character signals over the line conductor of said trunk and responsive to said first control perforation for preventing transmission over said line conductor of said start-of-message character signals and for transmitting sequentially a first pair of control signals and incoming line circuit identity signals over the control conductor of said trunk and responsive to said second control perforation for transmitting sequentially a second pair of control signals over the control conductor of said trunk, whereby said line conductor has transmitted thereover only the message body character signals and said end-of-message character signals; an outgoing line unit associated with said outgoing line and including a character transmitter selectively operative for transmitting over said outgoing line individual character signals corresponding to said start-of-message characters, and a monitor unit provided with a monitor tape and perforating means selectively operative for marking said monitor tape with perforations corresponding to cross-office unit identity signals transmitted thereto and with perforations corresponding to individual character signals transmitted over said outgoing line; and a cross-office unit terminating said trunk line and having access to said outgoing line and to said outgoing line unit and including a cross-office tape, a first cross-office tape perforator responsive to said character signals transmitted over the line conductor of said trunk for marking said cross-office tape with corresponding individual character perforations, a second cross-office tape perforator responsive to said first pair of control signals and to said incoming line circuit identity signals and to said second pair of control signals transmitted over the control conductor of said trunk line respectively for marking said cross-office tape with a first pair of control perforations and with incoming line circuit identity perforations and with a second pair of control perforations, whereby said cross-office tape has marked thereon in addition to said message body perforations and said end-of-message perforations and said control perforations further perforations identifying the incoming line circuit from which the message was received, detector means for detecting said first pair of control perforations and said second control perforations in said cross-office tape, a selectively operative outgoing line transmitter responsive to said individual character perforations in said cross-office tape for transmitting over said outgoing line individual character signals corresponding to said message body characters and to said end-of-message characters, and a transmission controller controlled by said detector in response to the detection of said first pair of control perforations for operating said character transmitter to transmit over said outgoing line individual character signals corresponding to said start-of-message characters and for transmitting to said monitor unit cross-office unit identity signals and controlled by said character transmitter in response to the completion of said start-of-message transmission for connecting said outgoing line transmitter to said outgoing line and to said monitor unit and for operating said outgoing line transmitter to transmit over said outgoing line and to said monitor unit individual character signals corresponding to said message body characters and to said end-of-message characters and controlled by said detector in response to the detection of said second pair of control perforations for terminating operation of said outgoing line transmitter a predetermined period thereafter.

6. The telegraph switching center set forth in claim 5, wherein the perforator means of said monitor unit includes a first monitor tape perforator responsive to individual character signals transmitted by said outgoing line transmitter and a second monitor tape perforator responsive to cross-office unit identity signals transmitted by said transmission controller.

7. The telegraph switching center set forth in claim 6, wherein said first incoming line tape perforator and said first cross-office tape perforator and said first monitor tape perforator mark the respectively associated tapes in the major portion thereof and wherein said second incoming line tape perforator and said second cross-office tape perforator and said second monitor tape perforator mark the respectively associated tapes in one border portion thereof.

8. In a telegraph switching center, a reperforator arranged to reperforate a tape in accordance with a plurality of signals for each character in a received message containing plural character control information, a transmitter associated with said reperforator, sensing means for reading said tape for thereby detecting said plural character control information and for controlling said transmitter in accordance therewith to transmit a single signal indicative of said plural character control information, a second tape, and other means responsive to the receipt of signals received from said transmitter and controlled by said single signal for recording a single marking in said second tape indicative of said plural character control information.

9. In an arrangement such as claimed in claim 8, means controlled responsive to said single marking for transmitting the corresponding plural character control information.

10. For use in a telegraph switching center wherein a received telegraph message having a plural character start-of-message indicator is recorded in code form with each character recorded in a predetermined successive sequence, transmitting means associated with said recorded message, further recording means controlled by said transmitting means, and means controlled responsive to said recorded plural character start-of-message indicator for controlling said transmitting means to transmit a single signal indicative of said start-of-message indicator for recording by said further recording means.

11. In an arrangement such as claimed in claim 10, means controlled by said single signal for enabling the transmission of an identity number corresponding to said transmitting means for recording by said further recording means.

12. In an arrangement such as claimed in claim 10, means controlled responsive to said transmitted single signal for controlling said recording means to record a single indication indicative of said start-of-message indicator.

13. In an arrangement such as claimed in claim 12, means controlled responsive to the recording of said single indication indicative of said start-of-message indicator for transmitting a plural character start-of-message indicator.

14. For use in a telegraph switching center wherein each received telegraph message is recorded for transmission to one of a plurality of outgoing lines corresponding to a routing indicator in each message and each recorded message includes plural character control information for controlling the equipment at said switching center to route each message to an outgoing line corresponding to said routing indicator, transmitting means for transmitting said received message, and means for controlling said transmitting means to transmit a single signal to indicate said plural character control information for thereafter controlling the transmission of said message to a corresponding outgoing line.

References Cited in the file of this patent

UNITED STATES PATENTS

| | | |
|---|---|---|
| 2,575,329 | Blanton | Nov. 20, 1951 |
| 2,703,338 | Stiles | Mar. 1, 1955 |